United States Patent
Imanishi et al.

(10) Patent No.: US 6,846,350 B2
(45) Date of Patent: Jan. 25, 2005

(54) RED LUMINOUS INK COMPOSITION

(75) Inventors: Keishi Imanishi, Minoh (JP); Yasuhiro Yamasaki, Neyagawa (JP)

(73) Assignee: Orient Chemical Industries, Ltd., Osaka-fu (JP)

(*) Notice: Subject to any disclaimer, the term of this patent is extended or adjusted under 35 U.S.C. 154(b) by 92 days.

(21) Appl. No.: 10/195,463

(22) Filed: Jul. 16, 2002

(65) Prior Publication Data

US 2003/0106460 A1 Jun. 12, 2003

(30) Foreign Application Priority Data

Jul. 16, 2001 (JP) ......................................... 2001-215372

(51) Int. Cl.[7] .............................................. C09D 11/00
(52) U.S. Cl. .............................. 106/31.14; 106/31.32; 106/31.64; 252/301.35
(58) Field of Search .......................... 106/31.14, 31.32, 106/31.64; 252/301.35

(56) References Cited

U.S. PATENT DOCUMENTS

| | | | |
|---|---|---|---|
| 3,473,027 A | 10/1969 | Freeman et al. | 250/365 |
| 4,833,311 A | 5/1989 | Jalon | 235/491 |
| 5,158,703 A * | 10/1992 | Takuma et al. | 252/301.35 |
| 5,542,971 A | 8/1996 | Auslander et al. | 106/31.15 |
| 5,693,693 A | 12/1997 | Auslander et al. | 524/88 |
| 5,755,860 A * | 5/1998 | Zhu | 106/31.15 |
| 5,837,042 A | 11/1998 | Lent et al. | 106/31.14 |
| 5,939,468 A * | 8/1999 | Siddiqui | 523/161 |
| 6,402,986 B1 * | 6/2002 | Jones et al. | 252/301.16 |
| 2003/0012562 A1 * | 1/2003 | Lawandy et al. | 386/126 |
| 2003/0110979 A1 * | 6/2003 | Imanishi et al. | 106/31.14 |

FOREIGN PATENT DOCUMENTS

| | | |
|---|---|---|
| JP | 64-6085 | 1/1989 |
| JP | 64-26583 | 1/1989 |
| WO | WO 97/10307 | 3/1997 |

* cited by examiner

Primary Examiner—Helene Klemanski
(74) Attorney, Agent, or Firm—Birch, Stewart, Kolasch & Birch, LLP

(57) ABSTRACT

Disclosed is a red luminous ink composition comprising a europium complex represented by the formula:

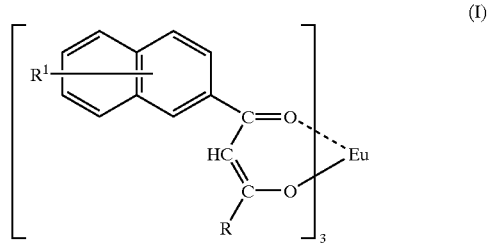

(I)

wherein $R^1$ is a hydrogen atom or a substituent selected from the group consisting of an alkyl group having from 1 to 4 carbon atoms, an alkoxy group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 6 carbon atoms, a substituted or unsubstituted aralkyl group having from 7 to 10 carbon atoms and a substituted or unsubstituted aryl group having from 6 to 12 carbon atoms. The red luminous ink composition exhibits satisfactory emission intensity under ultraviolet irradiation.

7 Claims, 4 Drawing Sheets

RED LUMINOUS INK COMPOSITION

BACKGROUND OF THE INVENTION

1. Field of the Invention

The present invention relates to red luminous ink compositions containing a europium complex the absorption wavelength of which is within the ultraviolet region and the fluorescent luminescence region of which is within the red region.

2. Description of the Related Art

In recent years, the term "functional organic compound" has come to be used and organic substances for use in electronic or optical devices are actively studied. Of such substances, luminous compounds (self-luminous compounds) capable of showing a photoluminescence (PL) phenomenon are known.

One application of luminous compounds is security ink. The security ink is an ink such that a handwriting is invisible under visible light, but when being irradiated with ultraviolet rays, e.g., a black light lamp, the handwriting emits light and one can read the information recorded.

The security ink is used for the purpose of preventing forgery or reproduction or of recording secret information. For instance, if lot numbers or codes of items are recorded with a security ink, it becomes easy to trace the distribution channels of the items or to prevent production or distribution of counterfeit products, and the fear of manipulation or damage of recorded information is reduced because the information is invisible under visible light.

In Japanese Patent Laid-Open Publication No. 2000-144029, proposed is an ink composition with the following features: being substantially invisible within the visible light region; containing europium (Eu) complex having an emission center wavelength at 615±20 μm when being excited with ultraviolet rays; containing a polyvinyl resin; containing, as a neutral ligand, at least a phosphoric acid type compound selected from a phosphine oxide compound, a phosphine sulfide compound and a phosphine compound; and containing not less than 94% of water and/or ethanol in a solvent.

In Japanese Patent Laid-Open Publication No. 2000-160083, proposed is an ink composition for ink jet printing containing, as a luminous material, from 0.001 to 5% by weight of 4,4,4-trifluoro-1-(2-thienyl)-1,3-butanedionate.europium chelate compound and also containing not less than 70% by weight of an alcoholic solvent as a solvent.

With respect to the ink composition using a europium complex as a luminous compound, known are an aqueous ink that becomes visible when being irradiated with ultraviolet rays (Japanese Patent Publication No. S54(1979)-22336), a fluorescent europium complex for thermal transfer (Japanese Patent Publication No. H6(1994)-15269), a luminous ink composition containing a europium complex in which a bidentate ligand, e.g., bipyridine derivative or phenanthroline derivative, coordinates to a europium (Japanese Patent Laid-Open Publication No. H3(1991)-50291), and an ink composition which contains a tetra (benzoyl trifluoroacetonate) europium complex having an ammonium salt as a counter ion (Japanese Patent Laid-Open Publications No. S64(1989)-6085 and No. S64(1989)-26583).

Considering practical use as a security ink, a handwriting or security information recorded with the ink is required to emit to a degree such that the ink is clearly visible when being irradiated with ultraviolet rays, e.g., a black light lamp (365 nm light). However, the conventional luminous compounds or ink compositions is unsatisfactory in emission intensity or have a problem in stability when the ink contains alcohol as a solvent.

There is therefore a demand for providing a red luminous ink composition that exhibits excellent emission intensity such that a handwriting or image recorded which is substantially invisible within the visible light region can be visually recognized clearly.

SUMMARY OF THE INVENTION

The present invention intends to solve the above-described conventional problems about the emission intensity, the dissolution stability of ink and the fastness of security information. The object of the present invention is to provide a red luminous ink composition that is substantially colorless under visible light, but has absorption within a wavelength in the ultraviolet region and, when being excited by ultraviolet light, generates intense emission at a wavelength near a red color (600–635 nm).

The present invention provides a red luminous ink composition comprising a europium complex represented by the formula:

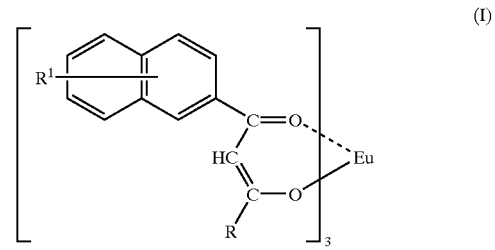

wherein $R^1$ is a hydrogen atom or a substituent selected from the group consisting of an alkyl group having from 1 to 4 carbon atoms, an alkoxy group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 6 carbon atoms, a substituted or unsubstituted aralkyl group having from 7 to 10 carbon atoms and a substituted or unsubstituted aryl group having from 6 to 12 carbon atoms. This can achieve the above-mentioned object.

Of the red luminous ink compositions of the present invention, preferred is a red luminous ink composition comprising from 0.001 to 5.0% by weight of a europium complex represented by the formula:

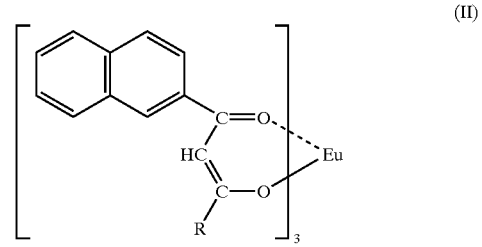

wherein R is a group selected from the group consisting of a fluorine-comprising alkyl group having from 1 to 20 carbon atoms, a substituted or unsubstituted alkyl group having from 1 to 6 carbon atoms, a substituted or unsubstituted aralkyl group having from 7 to 10 carbon atoms and a substituted or unsubstituted aryl group having from 6 to 12 carbon atoms, and not less than 60% by weight of an alcoholic solvent.

It is possible to provide an ink composition that is useful in the fields of documents in offices, blind printing such as marking and barcodes of various types of containers, and printed materials with security functions because it is substantially invisible under visible light but exhibits an intense emission color within the red region under ultraviolet light.

Heretofore, rare earth metal, that is europium-type β-diketone complexes are known as red luminous compounds for an ink composition. As such europium complexes, there are many proposals as to europium complexes of thenoyltrifluoroacetone or benzotrifluoroacetone type that have, as a neutral ligand, a unidentate or bidentate ligand. However, no ink composition is known that contains a europium complex of naphthoyltrifluoroacetone type free of neutral ligand.

DETAILED DESCRIPTION OF THE INVENTION

Figure 1:
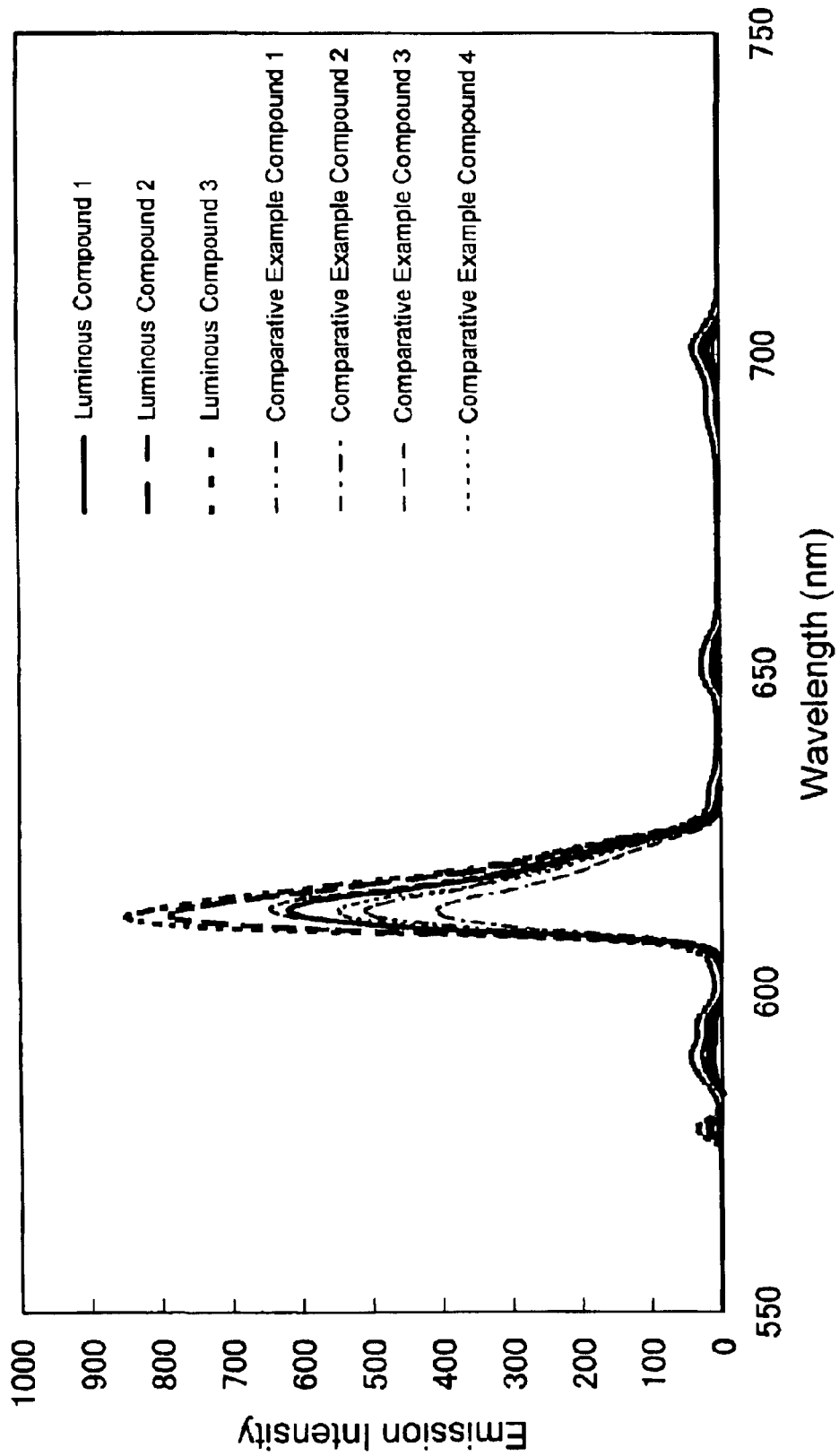
FIG. 1 shows the emission spectra of luminous compounds 1 to 3 and comparative example compounds 1 to 4 obtained in Synthesis Examples.
Figure 2:
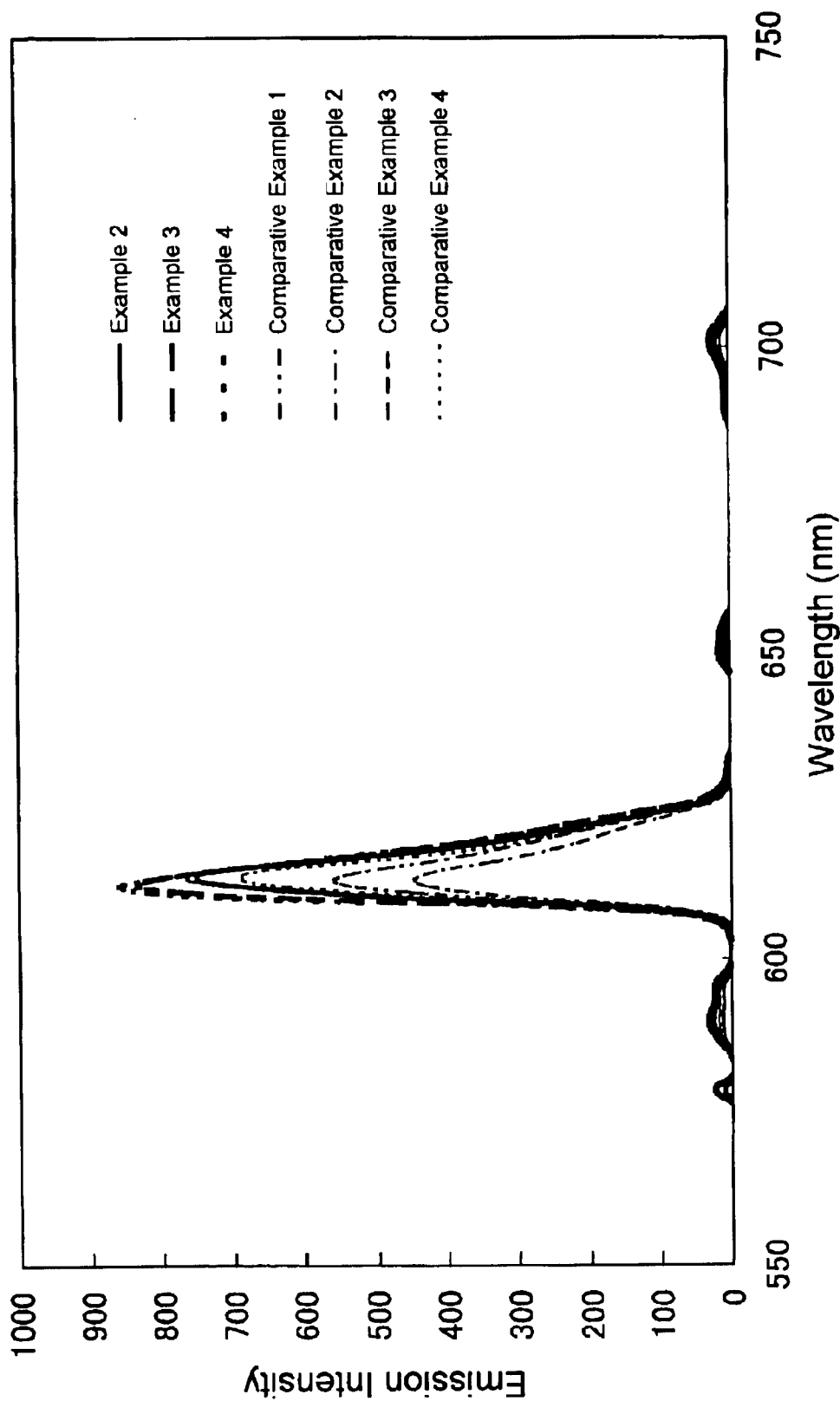
FIG. 2 shows the emission spectra of the ink compositions of Examples 2, 3 and 4 and Comparative Examples 1, 2, 3 and 4 using a polyvinyl pyrrolidone resin.
Figure 3:
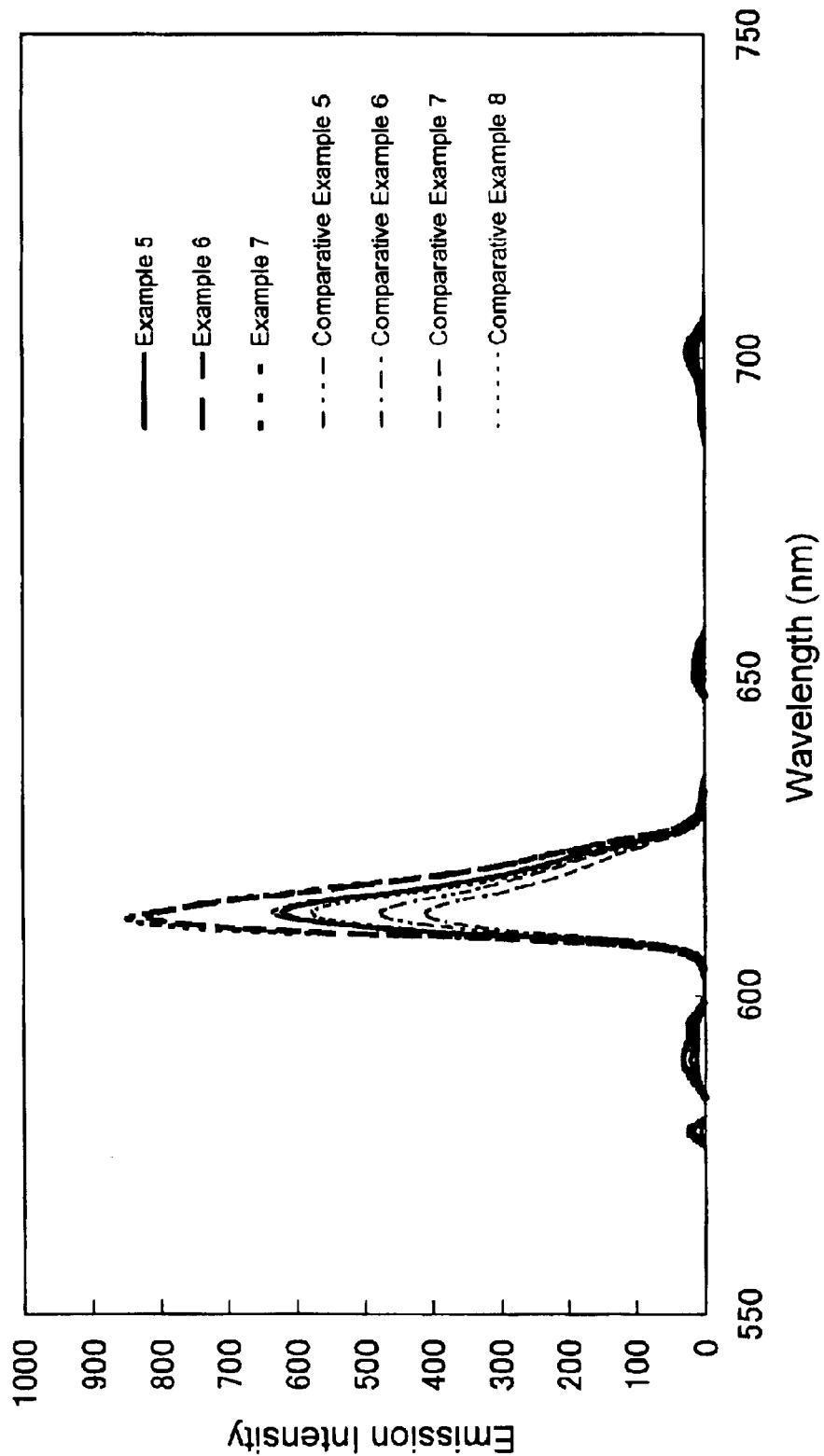
FIG. 3 shows the emission spectra of the ink compositions of Examples 5, 6 and 7 and Comparative Examples 5, 6, 7 and 8 using a polyvinyl butyral resin.
Figure 4:
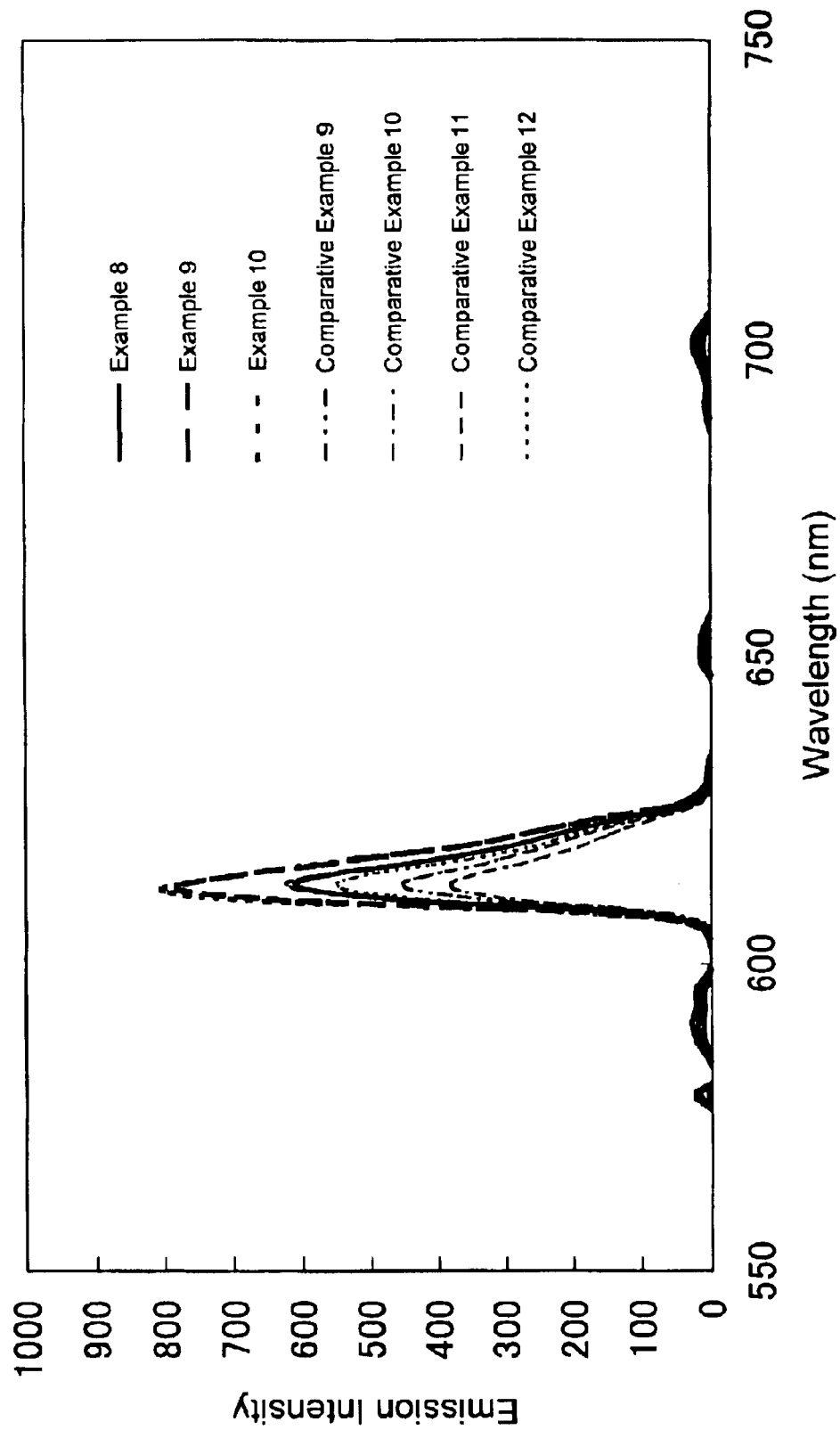
FIG. 4 shows the emission spectra of the ink compositions of Examples 8, 9 and 10 and Comparative Examples 9, 10, 11 and 12 using a polyacrylate resin.

The luminous compounds represented by formula (I) or (II) contained in the red luminous ink compositions of the present invention are ultraviolet excitation type europium complexes in which three molecules of specific β-diketone derivative with a 2-naphthyl group bonded thereto coordinate to one trivalent europium (rare earth metal).

In formula (I), substituent $R^1$ in the 2-naphthyl group may be an alkyl group, an alkoxy group or a halogen atom. More specifically, substituent $R^1$ in the 2-naphthyl group is selected from the group consisting of an alkyl group having from 1 to 4, preferably from 1 to 2 carbon atoms, an alkoxy group having from 1 to 4, preferably from 1 to 2 carbon atoms and a halogen atom.

Specific examples of the 2-naphthyl group include 2-naphthyl group, a 2-naphthyl group substituted with an alkyl group having from 1 to 4 carbon atoms such as 1-methyl-2-naphthyl group, 3-methyl-2-naphthyl group, 4-methyl-2-naphthyl group, 5-methyl-2-naphthyl group, 6-methyl-2-naphthyl group, 7-methyl-2-naphthyl group, 8-methyl-2-naphthyl group and 4-ethyl-2-naphthyl group; a 2-naphthyl group substituted with an alkoxyl group having from 1 to 4 carbon atoms such as 1-methoxy-2-naphthyl group, 3-methoxy-2-naphthyl group, 4-methoxy-2-naphthyl group, 5-methoxy-2-naphthyl group, 6-methoxy-2-naphthyl group, 7-methoxy-2-naphthyl group, 8-methoxy-2-naphthyl group and 6-ethoxy-2-naphthyl group; and a 2-naphthyl group substituted with halogen.

R in formula (I) or (II) may be fluorine-containing alkyl group, substituted or unsubstituted alkyl group, substituted or unsubstituted aralkyl group, or substituted or unsubstituted aryl group. More specifically, R is a fluorine-containing alkyl group having from 1 to 20 carbon atoms such as $CF_3$ group, $CHF_2$ group, $CH_2F$ group, $C_2F_5$ group, $CH(CF_3)_2$ group, $CF_2CF_2CF_3$ group, $C_7F_{15}$ group or $C_nF_{2n+1}$ (wherein n is an integer of from 1 to 20); an alkyl group having from 1 to 6 carbon atoms such as methyl group, ethyl group and isopropyl group; an aralkyl group having from 7 to 10 carbon atoms such as benzyl group and benzyl group substituted with at least one fluorine atom; a phenyl group; a phenyl group having from 6 to 10 carbon atoms substituted with fluorine atom or alkyl group; and an aryl group having from 10 to 12 carbon atoms such as naphthyl group. R is preferably $CF_3$ group in general, and, especially, is preferably a perfluoroalkyl group having from 1 to 20 carbon atoms such as $C_nF_{2n+1}$ group (wherein n is an integer of from 1 to 20) and a perfluoroalkyl group having from 1 to 10 carbon atoms.

Specific examples of the europium complexes (I) or (II) which the ink compositions of the present invention contain are as follows:

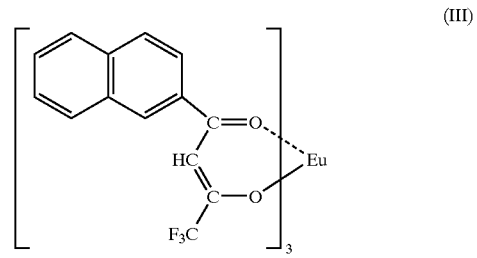

(III)

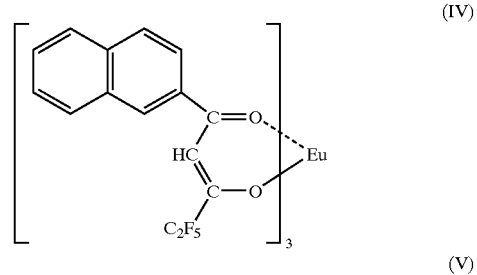

(IV)

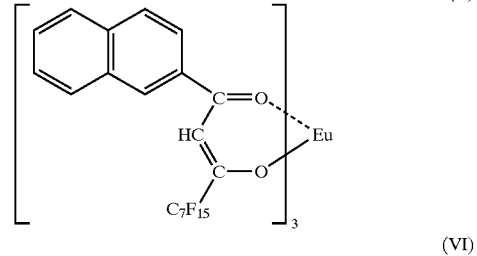

(V)

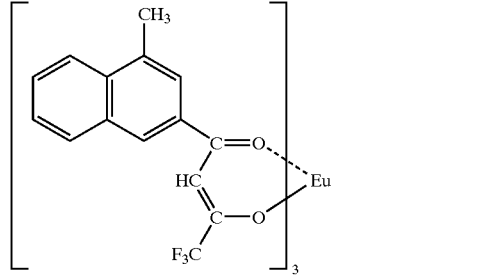

(VI)

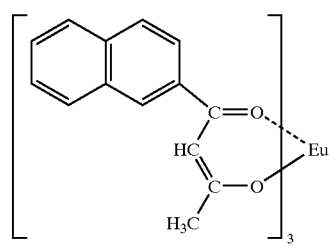

(VII)

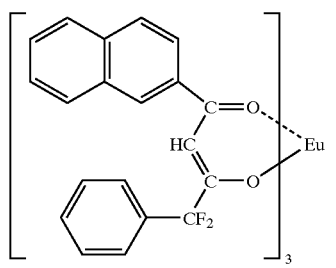

(VIII)

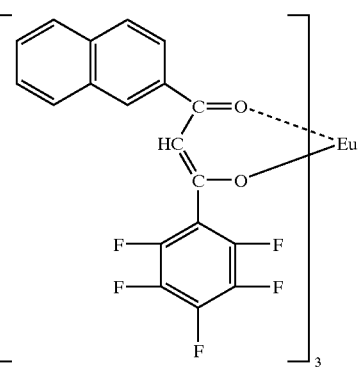

(IX)

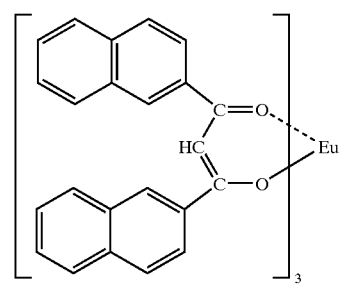

(X)

The europium complexes (I) or (II) contained in the ink compositions of the present invention can readily be obtained by heating and mixing, for example, 4,4,4-trifluoro-1-(2-naphthyl)-1,3-butanedione (3 mol) as a β-diketone derivative and trivalent europium chloride (1 mol) in the presence of 1 N NaOH in an organic solvent (e.g., ethanol).

The resulting europium complex is a colorless powder and is used as ultraviolet excitation type fluorescent luminescence developers (luminous compounds) for the ink compositions of the present invention. The ink compositions of the present invention can be obtained by dissolving this europium complex in a liquid medium, preferably an an alcoholic solvent, and optionally mixing therewith ingredients usually contained in ink compositions, such as a binder resin and various types of surfactants. The alcoholic solvent refers to a solvent containing alcohol as a main component. For example, a mixture of alcohol and water is included in the alcoholic solvent when the mixture contains the alcohol as a main component. The main component refers to the component contained in the solvent in an amount of not less than 60% by weight, preferably not less than 80% by weight.

The amount of the europium complex to be blended is set to be an amount such that the concentration of the europium complex in the total amount of an ink composition becomes from 0.01 to 5% by weight, preferably from 0.1 to 3% by weight. If the concentration of the europium complex in an ink composition is less than 0.001% by weight, the amount of light emission becomes small and it becomes difficult to read the emission. If the concentration of the europium exceeds 5% by weight, self-absorption may occur and the emission intensity is reduced.

Specific examples of the alcoholic solvent to be used for the ink compositions of the present invention include aliphatic alcohol such as methanol, ethanol, propanol, isopropanol and mixtures thereof, the alcoholic solvent may contain up to 30% by weight, preferably up to 10% by weight, of water. The combination amount of the alcoholic solvent to be blended in the ink compositions is preferably not less than 60% by weight, in other words, from 60% by weight to the whole rest, based on the total weights of the ink compositions. More preferably, the combination amount of the alcoholic solvent is from 80 to 95% by weight based on the total weights of the ink compositions.

Further, for the purpose of improving the stability of ink or preventing ink from drying at a pen tip or a nozzle, an ether solvent such as ethylene glycol monomethyl ether, ethylene glycol monoethyl ether and propylene glycol monomethyl ether, a glycol solvent (dihydric an alcoholic solvent) such as ethylene glycol, diethylene glycol and propylene glycol, or a polyol such as 1,2-hexanediol and 2,4,6-hexanetriol may be added to the ink compositions of the present invention. The addition amount thereof is preferably from 0 to 30% by weight based on the weights of the ink compositions of the present invention.

The ink compositions of the present invention may optionally contain a ketone solvent such as acetone, methyl ethyl ketone, methyl isobutyl ketone, cyclohexanone and 4-methoxy-4-methylpentanone, a hydrocarbon solvent such as cyclohexane, methylcyclohexane, n-pentane, n-hexane and n-heptane, an ester solvent such as ethyl acetate and n-propyl acetate, dimethyl sulfoxide, n-methyl-2-pyrrolidone, γ-butyrolactone, toluene, xylene and a high-boiling petroleum solvent. These solvents are used in alone or in combination of two or more.

A preferable solvent is an an alcoholic solvent that can dissolve therein a europium luminous compound contained in the ink compositions of the present invention with stability at a relatively high concentration such that the emission intensity of the compound becomes the maximum.

The binder resin used for the ink compositions of the present invention is an ingredient used for fixing the luminous compound to a recording material well. As the binder resin, used is a resin the solubility of which to the above-mentioned solvent is satisfactory and with which the viscosity of the ink compositions can be adjusted appropriately. Specific examples of the preferred binder resins include the resins listed below: a polyvinyl resin such as polyvinyl alcohol, polyvinyl butyral, polyvinyl pyrrolidone, vinyl pyrrolidone-vinyl acetate copolymers; a polyamine resin such as polyallylamine, polyvinylamine and polyethyleneimine; a polyacrylate resin such as polymethyl acrylate, polyethylene acrylate, polymethyl methacrylate and polyvinyl methacrylate; and an amino resin, an alkyd resin, an epoxy resin, a phenol resin, a polyesterimide resin, a polyamide resin, a polyamideimide resin, a silicone resin, a phenol resin, a ketone resin, rosin, a rosin-modified resin (phenol, maleic acid, fumaric acid resin, etc.), a petroleum resin, a cellulose resin such as ethyl cellulose and nitrocellulose, and a natural resin (gum arabic, gelatin, etc.)

Particularly preferred binder resins include a polyvinyl resin, a polyacrylate resin, a polyamine resin, etc., which are usually employed for ink for writing implements, ink jet ink, and printing ink.

The combination amount of the binder resin to be blended is, for example, from 0.5 to 30% by weight, preferably from 1 to 20% by weight based on the total weights of the ink compositions. If the amount is less than 0.5% by weight, it is impossible to fix luminous compounds to impermeable recording materials satisfactorily. On the other hand, if the amount is over 30% by weight, the injection stability of the ink compositions may be deteriorated. Further, a binder layer will resultantly cover thickly around a luminous compound, resulting in the probability of deterioration of emission of the luminous compound. Furthermore, in the use of too much binder resin, emission caused by the resin possibly causes some troubles.

In the case where a mixture of alcohol and water is used as an alcoholic solvent, some additives may be added such as various types of surfactants (e.g., an anionic, nonionic and cationic surfactants such as alkylsulfate, phosphate and polyoxyethylene alkyl ether and alkylamine salt; ampholytic surfactants, fluorine-containing surfactants, or acetylene glycol surfactants), a dispersant (e.g., rosin acid soap, stearic acid soap, oleic acid soap, Na-di-β-naphthylmethane disulfate, Na-lauryl sulfate and Na-diethylhexyl sulfosuccinate), or cyclodextrin (CD) (e.g., β-CD, dimethyl-β-CD, methyl-β-CD, hydroxyethyl-β-CD and hydroxypropyl-β-CD), antifoaming agents. These additives may be used in an amount of from 0.1 to 5% by weight, preferably from 1 to 3% by weight based on the ink compositions.

The europium luminous compound which the ink compositions of the present invention contain generally exhibits solubility or good dispersibility in a solvent and/or resin such as those mentioned above and, when being excited with ultraviolet rays, emits light within the red region (610 to 630 nm) (see Examples). For example, it is possible to excite a europium complex of the present invention to emit light within the red region by irradiating a solution of the europium complex in an organic solvent (e.g. ethanol solution) with ultraviolet light (about 365 nm) using an ultraviolet lamp such as a black light lamp. Accordingly, secret information recorded with an ink composition of the present invention emits no light under visible light but emits red light under ultraviolet light and, therefore, is useful as an security ink.

The present invention will be described specifically with reference to Synthesis Examples and Examples below, but the invention is not restricted thereto.

EXAMPLES

Synthesis Example 1

7.98 g (0.03 mol) of 4,4,4-trifluoro-1-(2-naphthyl)-1,3-butanedione (manufactured by Tokyo Kasei Kogyo Co., Ltd.), 3.66 g (0.01 mol) of europium (III) chloride hexahydrate (manufactured by Wako Pure Chemical Industries, Ltd.) and 30 ml of 1N sodium hydroxide were mixed in 100 ml of ethanol and the mixture was stirred with heating (at about 40° C. for about 1 hour) to obtain 8.5 g of luminous compound 1 (NTFA-Eu) of the structure illustrated below.

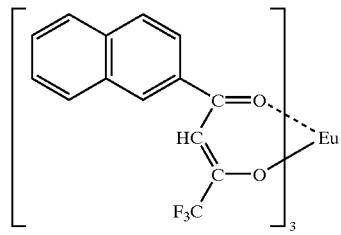

Synthesis Example 2

21.4 g (0.12 mol) of methyl pentafluoropropionate (manufactured by Lancaster Co.) and 17 g (0.10 mol) of 2-acetylnaphthalene (manufactured by Tokyo Kasei Kogyo Co., Ltd.) were allowed to react in the presence of 16.2 g (0.30 mol) of sodium methylate (manufactured by Wako Pure Chemical Industries, Ltd.) in 50 ml of dry ether to obtain 30 g of 4,4,5,5,5-pentafluoro-1-(2-naphthyl)-1,3-butanedione.

9.48 g (0.03 mol) of 4,4,5,5,5-pentafluoro-1-(2-naphthyl)-1,3-butanedione as obtained above, 3.66 g (0.01 mol) of europium(III) chloride hexahydrate (manufactured by Wako Pure Chemical Industries, Ltd.) and 30 ml of 1N sodium hydroxide were mixed in 100 ml of ethanol and the mixture was stirred with heating (at about 40° C. for about 2 hours) to obtain 10 g of luminous compound 2 (NEFA-Eu) of the structure illustrated below.

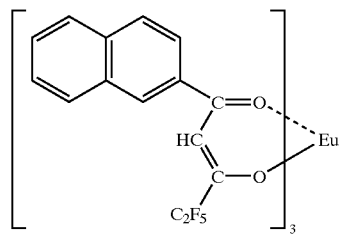

Synthesis Example 3

51.4 g (0.12 mol) of methyl perfluorooctanate (manufactured by Lancaster Co.) and 17 g (0.10 mol) of 2-acetylnaphthalene (manufactured by Tokyo Kasei Kogyo Co., Ltd.) were allowed to react in the presence of 16.2 g (0.30 mol) of sodium methylate (manufactured by Wako Pure Chemical Industries, Ltd.) in 50 ml of dry ether to obtain 50 g of 4,4-difluoro-4-perfluorohexyl-1-(2-naphthyl)-1,3-butanedione.

17 g (0.03 mol) of 4,4-difluoro-4-perfluorohexyl-1-(2-naphthyl)-1,3-butanedione as obtained above, 3.66 g (0.01 mol) of europium (III) chloride hexahydrate (manufactured by Wako Pure Chemical Industries, Ltd.) and 30 ml of 1N sodium hydroxide were mixed in 100 ml of ethanol and the mixture was stirred with heating (at about 40° C. for about 2 hours) to obtain 17 g of luminous compound 3 (NHFA-Eu) of the structure illustrated below.

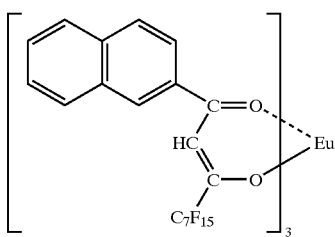

Comparative Example Compound 1

With reference to Japanese Patent Publication No. S54 (1979)-22336, an aqueous solution prepared by dissolving europium (III) chloride hexahydrate [3.66 g, 0.01 mol (manufactured by Wako Pure Chemical Industries, Ltd.)] in 100 ml of water and a solution prepared by dissolving thenoyltrifluoroacetone (4,4,4-trifluoro-1-(2-thienyl)-1,3-butanedione [7.98 g, 0.03 mol (manufactured by Tokyo Kasei Kogyo Co., Ltd.)] in 150 ml of ether were mixed. The mixture was adjusted to pH 8 to 9 with aqueous ammonia and was stirred at room temperature for 30 minutes. After separation of the water layer, the ether layer was washed with water, dried under anhydrous sodium carbonate and filtered. The ether in the filtrate was removed by evaporation to obtain 7.0 g of the objective compound of the structure shown below, that is comparative example compound 1 (TTFA-Eu).

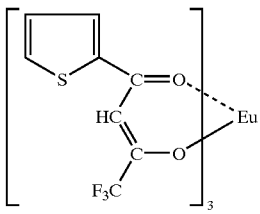

Comparative Example Compound 2

With reference to Japanese Patent Laid-Open Publication No. H4(1992)-220395, europium (III) nitrate hexahydrate [4.46 g, 0.01 mol (manufactured by Kishida Chemical Co.,Ltd.)] and benzoyltrifluoroacetone (4,4,4-trifluoro-1-phenyl-1,3-butanedione) [6.48 g, 0.03 mol (manufactured by Tokyo Kagaku K.K.)] were dissolved in 150 ml of ethanol and was stirred with heating. The solution was adjusted to pH 8.5 using tetramethylammonium hydroxide and was stirred for 15 minutes. Water (200 ml) was dropwise added to form a precipitate, and it was filtered to obtain 6.2 g of the objective compound of the structure shown below, that is comparative example compound 2 (BTFA-Eu).

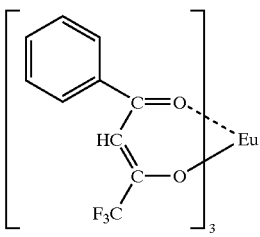

Comparative Example Compound 3

With reference to Japanese Patent Laid-Open Publication No. 2000-144029, 200 parts of ethanol was added to naphthoyltrifluoroacetone (4,4,4-trifluoro-1-(2-naphthyl)-1,3-butanedione) [7.98 g, 0.03 mol (manufactured by Tokyo Kasei Kogyo Co., Ltd.)] and triphenylphosphine oxide [5.56 g, 0.02 mol (manufactured by Tokyo Kasei Kogyo Co., Ltd.)] and the mixture was heated to be dissolved. 30 ml of 1N aqueous sodium hydroxide solution was added to the solution to neutralize, and 10 parts of 1 mol/L aqueous solution of europium (III) salt was dropwise added with stirring while the solution was kept at 40° C. The solution was then cooled and filtered to obtain 10 g of the objective compound of the structure shown below, that is comparative example compound 3 (NTFA-TPO-Eu) was obtained.

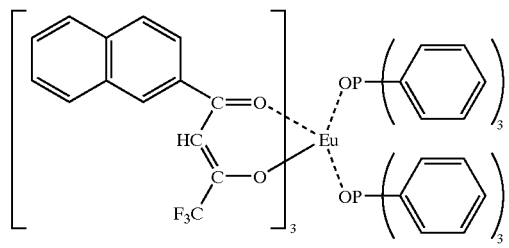

Comparative Example Compound 4

With reference to Japanese Patent Laid-Open Publication No. H8(1996)-67775, 28 ml of aqueous solution containing europium peroxide [7.2 g, 0.02 mol] was dropwise added to 500 ml of acetone solution containing naphthoyltrifluoroacetone (4,4,4-trifluoro-1-(2-naphthyl)-1,3-butanedione) [42.6 g, 0.16 mol (manufactured by Tokyo Kasei Kogyo Co., Ltd.)], sodium hydroxide [6.4 g, 0.16 mol] and 10 ml of water. After stirring for 1 hour, acetone was removed by evaporation under reduced pressure. To the residue were added 100 ml of ethanol and 500 ml of water. The mixture was well mixed, washed with water and dried. The resulting solid was dissolved in 370 ml of ethanol and then triethylamine [4.0 g, 0.04 mol] was added thereto. After being left stand for 1 hour, the mixture was filtered and the solid obtained was washed with water and dried under reduced pressure to obtain 42 g of the objective compound of the structure shown below, that is comparative example compound 4 (NTFA-TEA-Eu).

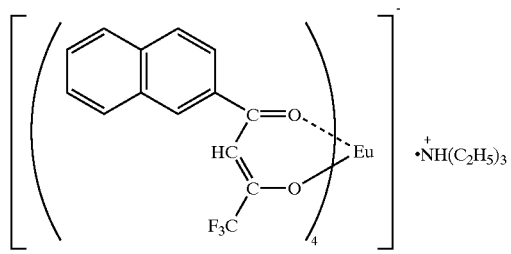

Example 1

In this Example, evaluation was carried out for europium luminous compounds 1 to 3 obtained in Synthesis Examples described above for use in ink compositions of the present invention and comparative example compounds 1 to 4. In the evaluation, 25 mg of each luminous compound was dissolved in 100 ml of ethanol and the fluorescence intensity (photoluminescence intensity) was measured with a spectrofluorometer (RF-5300PC manufactured by Shimadzu Corp.) In Table 1 are shown relative values of fluorescence intensity obtained by setting the fluorescence intensity of comparative example compound 1 equal to 1.00.

Further, the compounds (luminous compounds) were compared with respect to solubility. In the measurement of solubility, each of the luminous compound was dissolved with heating in 100 ml of ethanol and was left stand at room temperature for 24 hours. Then the insoluble matter was removed by filtration and the solubility (g/100 ml ethanol) was calculated. The results are shown in Table 1.

TABLE 1

| Examples of Luminous Compound (Abbrev.) | Fluorescence Intensity (Emission Center Wavelength) | Relative Fluorescence Intensity | Solubility |
|---|---|---|---|
| Luminous Compound 1 (NTFA—Eu) | 619 (613 nm) | 1.21 | 5 g or more |
| Luminous Compound 2 (NEFA—Eu) | 784 (612 nm) | 1.54 | 5 g or more |
| Luminous Compound 3 (NHFA—Eu) | 849 (612 nm) | 1.66 | 5 g or more |
| Comparative Example Compound 1 (TTFA—Eu) | 510 (613 nm) | 1.00 | 5 g or more |
| Comparative Example Compound 2 (BTFA—Eu) | 407 (613 nm) | 0.80 | 5 g or more |
| Comparative Example Compound 3 (NTFA—TPO—Eu) | 644 (613 nm) | 1.25 | 1.5 g |
| Comparative Example Compound 4 (NTFA—TEA—Eu) | 547 (613 nm) | 1.07 | 5 g or more |

FIG. 1 shows the emission spectra of luminous compounds 1 to 3 and comparative example compounds 1 to 4.

Examples 2 to 4 and Comparative Examples 1 to 4 are ink compositions in which the combination ratio of ethanol:ethylene glycol: polyvinyl pyrrolidone:luminous compound is 90:5:4:1 (ratio by weight).

Example 2

Luminous compound 1 (1 g) was dissolved in a solution of 90 g of ethanol and 5 g of ethylene glycol, and 4 g of polyvinyl pyrrolidone [PVP K-15 (trade name) manufactured by IPS K.K.] was added thereto to prepare ink composition (A). Using an inkjet recorder [HG5130 manufactured by Seiko Epson Corp.], bar-code printing was done on plain paper. When the printed material was irradiated with ultraviolet light (about 365 nm) using a black light lamp, brilliant red emission was observed (Table 4).

Example 3

Luminous compound 2 (1 g) was dissolved in a solution of 90 g of ethanol and 5 g of ethylene glycol, and 4 g of polyvinyl pyrrolidone [PVP K-15 (trade name) manufactured by IPS K.K.] was added thereto to prepare ink composition (B). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 4).

Example 4

Luminous compound 3 (1 g) was dissolved in a solution of 90 g of ethanol and 5 g of ethylene glycol, and 4 g of polyvinyl pyrrolidone [PVP K-15 (trade name) manufactured by IPS K.K.] was added thereto to prepare ink composition (C). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 4).

Comparative Examples 1 to 4

Ink compositions (a), (b), (c) and (d) were prepared in the same manner as Example 2 except that comparative example compounds 1, 2, 3 or 4 was employed respectively instead of luminous compound 1 used in Example 2. Using each of the ink compound, bar-code printing was done in the same manner as Example 2. When the printed materials were irradiated with ultraviolet light (about 365 nm) using a black light lamp, red emission was observed (Table 4).

Examples 5 to 7 and Comparative Examples 5 to 8 are ink compositions in which the combination ratio of ethanol: ethylene glycol: polyvinyl butyral: luminous compound is 90:5:4:1 (ratio by weight).

Example 5

Luminous compound 1 (1 g) was dissolved in a solution of 90 g of ethanol and 5 g of ethylene glycol, and 4 g of polyvinyl butyral [Elex BL-1 (trade name) manufactured by Sekisui Chemical Co., Ltd.] was added thereto to prepare ink composition (D). Using an inkjet recorder [HG5130 manufactured by Seiko Epson Corp.], bar-code printing was done on plain paper. When the printed material was irradiated with ultraviolet light (about 365 nm) using a black light lamp, brilliant red emission was observed (Table 5).

Example 6

Luminous compound 2 (1 g) was dissolved in a solution of 90 g of ethanol and 5 g of ethylene glycol, and 4 g of polyvinyl butyral [Elex BL-1 (trade name) manufactured by Sekisui Chemical Co., Ltd.] was added thereto to prepare ink composition (E). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 5).

Example 7

Luminous compound 3 (1 g) was dissolved in a solution of 90 g of ethanol and 5 g of ethylene glycol, and 4 g of polyvinyl butyral [Elex BL-1 (trade name) manufactured by Sekisui Chemical Co., Ltd.] was added thereto to prepare ink composition (F). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 5).

Comparative Examples 5 to 8

Ink compositions (e), (f), (g) and (h) were prepared in the same manner as Example 5 except that comparative example compounds 1, 2, 3 or 4 was respectively employed instead of luminous compound 1 used in Example 5. Using each of the ink compound, bar-code printing was done in the same manner as Example 5. When the printed materials were irradiated with ultraviolet light (about 365 nm) using a black light lamp, red emission was observed (Table 5).

Examples 8 to 10 and Comparative Examples 9 to 12 are ink compositions in which the combination ratio of ethanol:ethylene glycol: ethyl acetate: polyacrylate:luminous compound is 60:5:30:4:1 (ratio by weight).

Example 8

Luminous compound 1 (1 g) was dissolved in a solution of 60 g of ethanol, 5 g of ethylene glycol and 30 g of ethyl acetate, and 4 g of polyacrylate [NeoCry 1B-814 (trade name) manufactured by Avecia Limited] thereto to prepare ink composition (G). Using an inkjet recorder [HG5130 manufactured by Seiko Epson Corp.], bar-code printing was done on plain paper. When the printed material was irradiated with ultraviolet light (about 365 nm) using a black light lamp, brilliant red emission was observed (Table 6).

Example 9

Luminous compound 2 (1 g) was dissolved in a solution of 60 g of ethanol, 5 g of ethylene glycol and 30 g of ethyl acetate, and 4 g of polyacrylate [NeoCry 1B-814 (trade name) manufactured by Avecia Limited] was added thereto to prepare ink composition (H). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 6).

Example 10

Luminous compound 3 (1 g) was dissolved in a solution of 60 g of ethanol, 5 g of ethylene glycol and 30 g of ethyl acetate, and 4 g of polyacrylate [NeoCry 1B-814 (trade name) manufactured by Avecia Limited] was added thereto to prepare ink composition (I). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed (Table 6).

Comparative Examples 9 to 12

Ink compositions (i), (j), (k) and (l) were prepared in the same manner as Example 8 except that comparative example compounds 1, 2, 3 or 4 was employed respectively instead of luminous compound 1 used in Example 8. Using each of the ink compound, bar-code printing was done in the same manner as Example 8. When the printed materials were irradiated with ultraviolet light (about 365 nm) using a black light lamp, red emission was observed (Table 6).

Example 13

Luminous compound 2 (1 g) was dissolved in 84 g of ethanol and 15 g of polyallylamine [PAA-L (trade name) which is a 20% aqueous solution having a weight average molecular weight of about 10,000 manufactured by Nitto Boseki Co., Ltd.] was added thereto to prepare ink composition (J). Using an inkjet recorder [HG5130 manufactured by Seiko Epson Corp.], bar-code printing was done on plain paper. When the printed material was irradiated with ultraviolet light (about 365 nm) using a black light lamp, intense brilliant red emission was observed in the same manner as that composition B of Example 3.

Example 14

The ink compositions obtained in Example and Comparative Examples were tested with respect to the following characteristics.

Visibility: Whether the printed bar-code is clearly visible under ultraviolet irradiation was evaluated by visual inspection. The evaluation criteria are shown in Table 2 and the results of evaluation are shown in Tables 4 to 6.

TABLE 2

⊚ Being visually recognized at a concentration of 0.001%.
○ Being visually recognized clearly at a concentration of 0.01%.
Δ Being difficult to be recognized visually at a concentration of 0.01%.

container was stored for one month in an incubator conditioned at 50° C. Then, for the stored ink composition, presence of precipitate was evaluated by visual inspection. The evaluation criteria are shown in Table 3 and the results of evaluation are shown in Tables 4 to 6.

TABLE 3

○ No precipitate was found.
Δ A little precipitate was found.
x Much precipitate was found.

Relative fluorescence intensity: For investigating the emission intensity of each ink composition described above, each ink composition was diluted 50 times with the solvent used in preparing the ink and the fluorescence intensity (photoluminescence intensity) was measured using a spectro-fluorometer (RF-5300PC manufactured by Shimadzu Corp.) in the same manner as in Example 1. In Tables 2, 3 and 4 are shown relative values (%) of fluorescence intensities obtained by setting the fluorescence intensity of ink composition (a) of Comparative Example 1 measured at 613 nm equal to 100.

TABLE 4

|  | Example | | | Comparative Example | | | |
| --- | --- | --- | --- | --- | --- | --- | --- |
|  | 2 | 3 | 4 | 1 | 2 | 3 | 4 |
| Ink composition | A | B | C | a | b | c | d |
| Luminous Compound 1 (NTFA—Eu) | 1 | | | | | | |
| Luminous Compound 2 (NEFA—Eu) | | 1 | | | | | |
| Luminous Compound 3 (NHFA—Eu) | | | 1 | | | | |
| Comparative Example Compound 1 (TTFA—Eu) | | | | 1 | | | |
| Comparative Example Compound 2 (BTFA—Eu) | | | | | 1 | | |
| Comparative Example Compound 3 (NTFA—TPO—Eu) | | | | | | 1 | |
| Comparative Example Compound 4 (NTFA—TEA—Eu) | | | | | | | 1 |
| Ethanol | 90 | 90 | 90 | 90 | 90 | 90 | 90 |
| Ethylene glycol | 5 | 5 | 5 | 5 | 5 | 5 | 5 |

TABLE 4-continued

|  | Example | | | Comparative Example | | | |
| --- | --- | --- | --- | --- | --- | --- | --- |
|  | 2 | 3 | 4 | 1 | 2 | 3 | 4 |
| Polyvinyl pyrrolidone | 4 | 4 | 4 | 4 | 4 | 4 | 4 |
| Visibility | ○ | ◎ | ◎ | Δ | Δ | ○ | ○ |
| Stability | ○ | ○ | ○ | ○ | ○ | ○ | ○ |
| Relative Fluorescence Intensity (%) | 134 | 149 | 154 | 100 | 80 | 136 | 123 |

TABLE 5

|  | Example | | | Comparative Example | | | |
| --- | --- | --- | --- | --- | --- | --- | --- |
|  | 5 | 6 | 7 | 5 | 6 | 7 | 8 |
| Ink composition | D | E | F | e | f | g | h |
| Luminous Compound 1 (NTFA—Eu) | 1 | | | | | | |
| Luminous Compound 2 (NEFA—Eu) | | 1 | | | | | |
| Luminous Compound 3 (NHFA—Eu) | | | 1 | | | | |
| Comparative Example Compound 1 (TTFA—Eu) | | | | 1 | | | |
| Comparative Example Compound 2 (BTFA—Eu) | | | | | 1 | | |
| Comparative Example Compound 3 (NTFA—TPO—Eu) | | | | | | 1 | |
| Comparative Example Compound 4 (NTFA—TEA—Eu) | | | | | | | 1 |
| Ethanol | 90 | 90 | 90 | 90 | 90 | 90 | 90 |
| Ethylene glycol | 5 | 5 | 5 | 5 | 5 | 5 | 5 |
| Polyvinylbutyral | 4 | 4 | 4 | 4 | 4 | 4 | 4 |
| Visibility | ○ | ◎ | ◎ | Δ | Δ | ○ | ○ |
| Stability | ○ | ○ | ○ | ○ | ○ | Δ | ○ |
| Relative Fluorescence Intensity (%) | 130 | 171 | 178 | 100 | 86 | 133 | 121 |

TABLE 6

|  | Example | | | Comparative Example | | | |
| --- | --- | --- | --- | --- | --- | --- | --- |
|  | 8 | 9 | 10 | 9 | 10 | 11 | 12 |
| Ink composition | G | H | I | i | j | k | l |
| Luminous Compound 1 (NTFA—Eu) | 1 | | | | | | |
| Luminous Compound 2 (NEFA—Eu) | | 1 | | | | | |
| Luminous Compound 3 (NHFA—Eu) | | | 1 | | | | |
| Comparative Example Compound 1 (TTFA—Eu) | | | | 1 | | | |
| Comparative Example Compound 2 (BTFA—Eu) | | | | | 1 | | |
| Comparative Example Compound 3 (NTFA—TPO—Eu) | | | | | | 1 | |
| Comparative Example Compound 4 (NTFA—TEA—Eu) | | | | | | | 1 |
| Ethanol | 60 | 60 | 60 | 60 | 60 | 60 | 60 |
| Ethylene glycol | 5 | 5 | 5 | 5 | 5 | 5 | 5 |
| Ethyl acetate | 30 | 30 | 30 | 30 | 30 | 30 | 30 |
| Polyacrylate | 4 | 4 | 4 | 4 | 4 | 4 | 4 |
| Visibility | ○ | ◎ | ◎ | Δ | Δ | ○ | ○ |
| Stability | ○ | ○ | ○ | ○ | Δ | Δ | ○ |

TABLE 6-continued

|  | Example | | | Comparative Example | | | |
| --- | --- | --- | --- | --- | --- | --- | --- |
|  | 8 | 9 | 10 | 9 | 10 | 11 | 12 |
| Relative Fluorescence Intensity (%) | 135 | 173 | 178 | 100 | 85 | 138 | 121 |

What is claimed is:

1. A red luminous ink composition comprising 0.1% to 3.0% by weight of a europium complex represented by the formula:

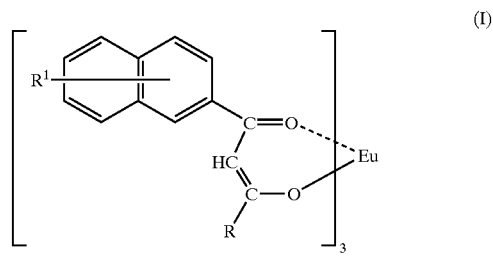

wherein $R^1$ is a hydrogen atom or a substituent selected from the group consisting of an alkyl group having from 1 to 4 carbon atoms, an alkoxy group having from 1 to 4 carbon atoms and a halogen atom, R is a group selected from the group consisting of a fluorine-comprising alkyl group having from 1 to 20 carbon atoms, a substituted or unsubstituted alkyl group having from 1 to 6 carbon atoms, a substituted or unsubstituted aralkyl group having from 7 to 10 carbon atoms and a substituted or unsubstituted aryl group having from 6 to 12 carbon atoms, not less than 60% by weight of an alcoholic solvent, and 1 to 20% by weight of a solvent soluble resin selected from the group consisting of a polyvinyl resin, a polyamine resin and a polyacrylate resin.

2. The red luminous ink composition according to claim 1 wherein R is a perfluoroalkyl group having from 1 to 10 carbon atoms.

3. The red luminous ink composition according to claim 1 further comprising a solvent soluble resin selected from the group consisting of a polyvinyl resin, a polyamine resin and a polyacrylate resin.

4. A red luminous ink composition comprising from 0.001 to 5.0% by weight of a europium complex represented by the formula:

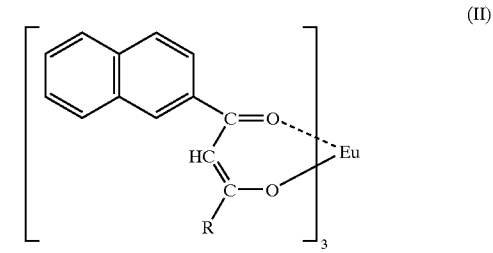

wherein R is a group selected from the group consisting of a fluorine-comprising alkyl group having from 1 to 20 carbon atoms, a substituted or unsubstituted alkyl group having from 1 to 6 carbon atoms, a substituted or unsubstituted aralkyl group having from 7 to 10 carbon atoms and a substituted or unsubstituted aryl group having from 6 to 12 carbon atoms, and not less than 60% by weight of an alcoholic solvent.

5. The red luminous ink composition according to claim 4 wherein R is a perfluoroalkyl group having from 1 to 10 carbon atoms.

6. The red luminous ink composition according to claim 4 further comprising a solvent soluble resin selected from the group consisting of a polyvinyl resin, a polyamine resin and a polyacrylate resin.

7. The red luminous ink composition according to claim 1, wherein the alcoholic solvent is selected from the group consisting of methanol, ethanol, propanol, isopropanol and mixtures thereof.

* * * * *